United States Patent
Yamashita et al.

(10) Patent No.: US 11,221,018 B2
(45) Date of Patent: Jan. 11, 2022

(54) COMPRESSOR (71) Applicant: MITSUBISHI HEAVY INDUSTRIES COMPRESSOR CORPORATION, Tokyo (JP)

(72) Inventors: Shuichi Yamashita, Tokyo (JP); Jo Masutani, Tokyo (JP); Chihiro Myoren, Tokyo (JP); Shinichiro Tokuyama, Hiroshima (JP); Yuta Okumura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 43 days.

(21) Appl. No.: 16/822,470

(22) Filed: Mar. 18, 2020

(65) Prior Publication Data
US 2020/0309150 A1 Oct. 1, 2020

(30) Foreign Application Priority Data
Mar. 26, 2019 (JP) .............................. JP2019-059367

(51) Int. Cl.
*F04D 29/40* (2006.01)
*F04D 29/42* (2006.01)
(Continued)

(52) U.S. Cl.
CPC ....... *F04D 29/4206* (2013.01); *F04D 17/122* (2013.01); *F04D 29/046* (2013.01);
(Continued)

(58) Field of Classification Search
CPC .... F04D 17/122; F04D 29/284; F04D 29/046; F04D 29/4206; F04D 29/441; F05D 2250/51; F05D 2250/52
See application file for complete search history.

(56) References Cited

U.S. PATENT DOCUMENTS

| | | | |
|---|---|---|---|
| 2012/0141262 A1* | 6/2012 | Kim ...................... | F04D 29/441 415/204 |
| 2013/0183146 A1* | 7/2013 | Minegishi ............. | F04D 19/007 415/177 |

(Continued)

FOREIGN PATENT DOCUMENTS

JP 2012-184758 A 9/2012

*Primary Examiner* — Ninh H. Nguyen
(74) *Attorney, Agent, or Firm* — Osha Bergman Watanabe & Burton (57) ABSTRACT

A compressor includes a rotation shaft that is capable of rotating around a main axis, an impeller provided integrally with the rotation shaft, a casing that covers the impeller from an outer circumferential side and forms a flow path through which a working fluid circulates, a discharge scroll that is provided at an end of the flow path on a downstream side and extends in a spiral shape around the main axis, a discharge nozzle that communicates with the discharge scroll on the downstream side and extends from the discharge scroll in a tangent direction around the main axis, and a pressure loss body that has a plate shape extending in a direction orthogonal to an axis of the discharge nozzle extending in a radial direction orthogonal to the main axis and is capable of blocking a part of a flow path cross-section of the discharge nozzle.

8 Claims, 4 Drawing Sheets (51) Int. Cl.
*F04D 17/12* (2006.01)
*F04D 29/046* (2006.01)
*F04D 29/28* (2006.01)

(52) U.S. Cl.
CPC ........ *F04D 29/284* (2013.01); *F05D 2250/51* (2013.01); *F05D 2250/52* (2013.01); *F16C 2360/44* (2013.01)

(56) References Cited

U.S. PATENT DOCUMENTS

2014/0321988 A1* 10/2014 Husted .................. F04D 29/464
 415/148
2015/0270566 A1* 9/2015 Lee ..................... F04D 29/5826
 429/455

\* cited by examiner

COMPRESSOR

BACKGROUND OF THE INVENTION

Field of the Invention

The present invention relates to a compressor.

Priority is claimed on Japanese Patent Application No. 2019-059367, filed Mar. 26, 2019, the content of which is incorporated herein by reference.

Description of Related Art

A general centrifugal compressor includes a rotation shaft that can rotate around an axis, one or a plurality of impellers provided integrally with the rotation shaft, and a casing covering the impellers from an outer circumferential side and forming a flow path in which a working fluid circulates. A suction nozzle and a discharge nozzle are provided at each of the ends of the flow path on the upstream side and the downstream side. When the rotation shaft rotates, a working fluid is sucked into the flow path from the suction nozzle, and the working fluid is brought into a high pressure state due to the impeller halfway through the flow path. The high-pressure working fluid is taken outside from the discharge nozzle.

Here, the centrifugal compressor described above may unstably behave in a case where it is operated at a lower flow rate than a rated flow rate. Specifically, if a flow rate is low, pressure loss on the discharge nozzle side becomes insufficient, and thus it is not likely to stably gain a lifting height. As a technology for realizing a stable operation under the above-described operation conditions, for example, the technology disclosed in Japanese Unexamined Patent Application, First Publication No. 2012-184758 is known. In the device disclosed in Japanese Unexamined Patent Application, First Publication No. 2012-184758, an area adjusting means for incurring pressure loss is provided in an outlet scroll. It is intended to obtain sufficient pressure loss even at a low flow rate by reducing a flow path sectional area of the outlet scroll using the area adjusting means.

SUMMARY OF THE INVENTION

However, since the outlet scroll has a complicated shape, a flow of the working fluid therein does not exhibit uniform distribution in the flow path cross-section. Thus, even if the area adjusting means disclosed in Japanese Unexamined Patent Application, First Publication No. 2012-184758 is provided, it may be difficult to incur a desired degree of pressure loss.

The present invention aims to provide a compressor that can operate more stably.

A compressor according to an aspect of the present invention includes a rotation shaft that is capable of rotating around a main axis, an impeller provided integrally with the rotation shaft, a casing that covers the impellers from an outer circumferential side and forms a flow path through which a working fluid circulates, a discharge scroll that is provided at an end of the flow path on a downstream side and extends in a spiral shape around the main axis, a discharge nozzle that communicates with the discharge scroll on the downstream side and extends from the discharge scroll in a tangent direction around the main axis, and a pressure loss body that has a plate shape extending in a direction orthogonal to an axis of the discharge nozzle extending in a radial direction orthogonal to the main axis and is capable of blocking a part of a flow path cross-section of the discharge nozzle.

According to the above-described configuration, since the pressure loss body is provided, a part of the flow path cross-section of the discharge nozzle can be blocked. Accordingly, pressure loss of a working fluid in the discharge nozzle can be ensured. In particular, since the fluid exhibits a uniform flow rate distribution in the flow path cross-section orthogonal to the axis in the discharge nozzle, a magnitude of pressure loss can be adjusted more easily and accurately than in a case where the pressure loss body is provided at another part of the compressor.

In the compressor, the pressure loss body may be provided at a radially outer end of the discharge nozzle from the main axis.

According to the above-described configuration, since the pressure loss body is provided at the radially outer end of the discharge nozzle, the pressure loss body can be easily accessible from outside and thus can be attached more easily. In addition, since the flow path cross-section at the radially outer end of the discharge nozzle exhibits a more uniform flow rate distribution than that on the radially inner part, a magnitude of pressure loss can be adjusted more easily and accurately.

In the compressor, the pressure loss body may be provided at a position in the middle of the discharge nozzle in the axial direction.

According to the above-described configuration, the pressure loss body is provided at a position in the middle of the discharge nozzle. Thus, since a position of the pressure loss body can be set with a higher degree of freedom, a magnitude of pressure loss can be adjusted more precisely.

In the compressor, the pressure loss body may be provided at a part away from the discharge scroll with respect to a division line passing through a position of the axis on the flow path cross-section of the discharge nozzle.

Here, the working fluid flows from the discharge scroll to the discharge nozzle in a tangent direction of the main axis. When passing through the discharge scroll, a centrifugal force away from the main axis acts on the working fluid. Accordingly, a flow rate is relatively high at a portion on a side away from the discharge scroll on the flow path cross-section of the discharge nozzle. According to the above-described configuration, since the pressure loss body is provided at the part exhibiting a relatively high flow rate as described above, pressure loss can be incurred more effectively.

In the compressor, the pressure loss body may extend along an inner circumferential surface of the discharge nozzle and have a ring shape around the axis.

According to the above-described configuration, the pressure loss body has a ring shape around the axis A. That is, since the shape of the pressure loss body is simple, a magnitude of pressure loss at the discharge nozzle can be adjusted more easily at low cost.

In the compressor, the pressure loss body may be provided only at a center part including the axis of the discharge nozzle.

According to the above-described configuration, the pressure loss body is provided only at the center part of the discharge nozzle. That is, since the shape of the pressure loss body is simple, a magnitude of pressure loss at the discharge nozzle can be adjusted more easily at low cost.

In the compressor, the pressure loss body may have a plate shape covering the flow path cross-section and is capable of pivoting around a pivot axis extending in a direction orthogonal to the axis.

According to the above-described configuration, by pivoting the pressure loss body around the pivot axis, a flow path cross-sectional area of the discharge nozzle can be freely adjusted even after completion of construction. As a result, a magnitude of pressure loss of the discharge nozzle can be adjusted more easily and accurately.

In the compressor, the pressure loss body may be formed of a perforated plate.

According to the above-described configuration, since the pressure loss body is formed of a perforated plate, a magnitude of pressure loss at the discharge nozzle can be adjusted more easily and accurately by, for example, changing a proportion of holes in an area of the perforated plate.

According to the present invention, a compressor that can operate more stably can be provided.

DETAILED DESCRIPTION OF THE INVENTION

First Embodiment

Figure 1:
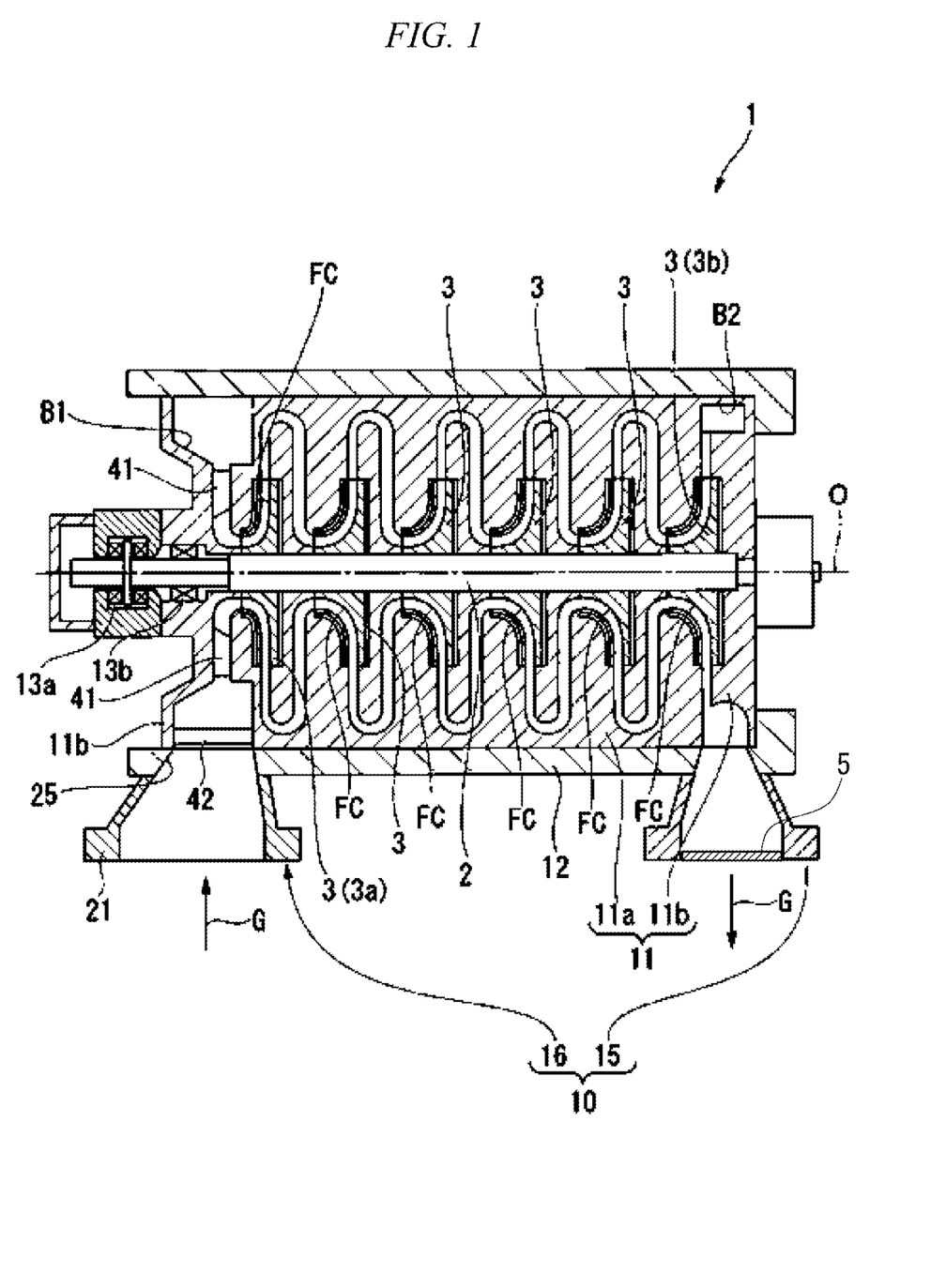
FIG. 1 is a cross-sectional diagram showing a configuration of a compressor according to a first embodiment of the present invention.
Figure 2:
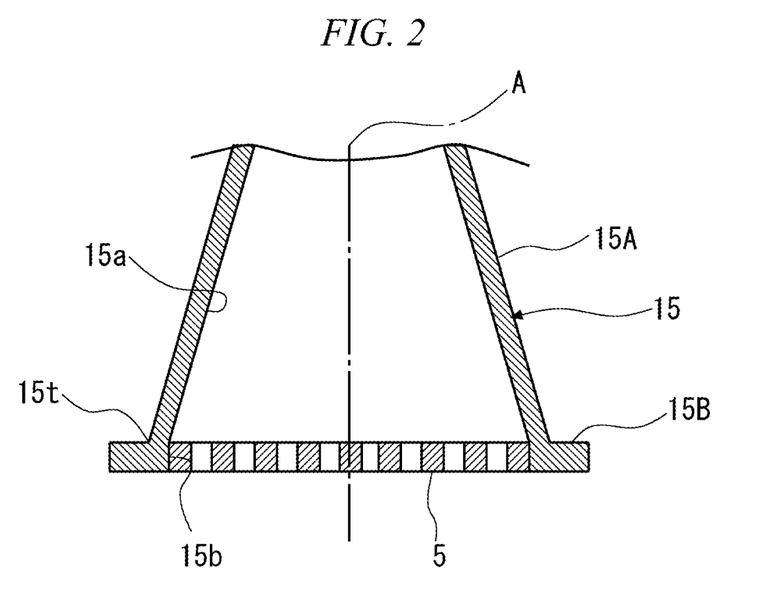
FIG. 2 is an enlarged cross-sectional diagram showing a discharge nozzle according to the first embodiment of the present invention.

A first embodiment of the present invention will be described with reference to FIGS. 1 and 2. A centrifugal compressor 1 (compressor) mainly includes a rotation shaft 2 that rotates around a main axis O, impellers 3 that are fixed to the rotation shaft 2 and compress a process gas G working as a fluid using a centrifugal force, and a casing 10 that supports the rotation shaft 2 to be capable of rotating as shown in FIG. 1.

The rotation shaft 2 has a cylindrical shape around the main axis O. A plurality of impellers 3 are arrayed separately from each other in the direction of the main axis O. Each of the impellers 3 has substantially a disc shape, is fitted to the rotation shaft 2, and is thus capable of rotating with respect to the main axis O along the rotation shaft 2. In addition, a flow path FC through which the process gas G can circulate is formed in each of the impellers 3.

The casing 10 has a casing body 11 that covers each of the impellers 3 from an outer circumferential side and has a thrust bearing 13a and a radial bearing 13b supporting the rotation shaft 2 and the impellers 3 to be capable of rotating, an outer casing body 12 that covers the casing body 11 from an outer circumferential side, and a suction nozzle 16 and a discharge nozzle 15 provided in the outer casing body 12.

The casing body 11 has a plurality of diaphragms 11a having a disc shape around the main axis O and a head 11b that sandwiches these diaphragms between both ends thereof in the direction of the main axis O in the present embodiment.

The casing body 11 has a suction scroll B1 formed on one side of a first-stage impeller 3a in the direction of the main axis O that is an entrance side of the impeller 3a (the impeller 3 disposed at one end in the direction of the main axis O). In addition, the casing body 11 has a discharge scroll B2 formed on a radially outer side of a final-stage impeller 3b that is an outlet side of the impeller 3b (the impeller 3 disposed at the other end in the direction of the main axis O).

The suction scroll B1 is formed inside the casing body 11, has a spiral shape around the main axis O, causes the process gas G flowing inward from a radially outer side of the casing body 11 to circulate in the direction of the main axis O and introduces the process gas into the flow path FC of the first-stage impeller 3a. The discharge scroll B2 is formed inside the casing body 11, has a ring shape around the main axis O, and discharges the process gas G flowing outward to radially outward from the flow path FC of the final-stage impeller 3b from the casing body 11 outside.

The outer casing body 12 has a cylindrical shape around the main axis O, covers the casing body 11 from an outer circumferential side, and fixes the casing body 11. The discharge nozzle 15 is provided in the outer casing body 12, communicates with the discharge scroll B2, and enables the process gas G to be discharged from the discharge scroll B2. That is, the discharge nozzle 15 extends radially outward from the outer casing body 12 at a position corresponding to a position at which the discharge scroll B2 is formed in the direction of the main axis O. The discharge nozzle 15 may be provided only at one position in the outer casing body 12 in a circumferential direction, or a plurality of discharge nozzles may be provided separately from each other in the circumferential direction. A pressure loss body 5, which will be described below, is provided at the end of the discharge nozzle 15 on the outlet side.

The suction nozzle 16 communicates with the suction scroll B1 and allows the process gas G to be sucked from outside of the suction scroll B1. That is, the suction nozzle 16 extends radially outward from the outer casing body 12 at a position corresponding to a position at which the suction scroll B1 is formed in the direction of the main axis O.

The suction scroll B1 is a gas flow path for the process gas G formed on an outer circumferential side of the rotation shaft 2 having a spiral shape around the main axis O. A plurality of guide vanes 41 disposed in a radial shape around the main axis O are provided inside the suction scroll B1 in the outer casing body 12 such that the guide vanes surround the rotation shaft 2. These guide vanes 41 are disposed to be symmetric to the left and right when viewed in the direction of the main axis O. A cross-sectional shape of each of the guide vanes 41 orthogonal to the main axis O is formed to bend toward the rotation shaft 2 in the radial direction as the cross-sectional shape becomes closer to the rotation shaft 2. In addition, the guide vanes 41 enable the process gas G from a main suction nozzle 21 to be introduced from a radially outer side and one side of the main axis O toward the flow path FC of the impellers 3.

One inlet straightening plate 42 disposed on the axis of symmetry of the plurality of guide vanes 41 is provided near a main opening 25 formed inside the suction scroll B1 in the outer casing body 12. The inlet straightening plate 42 is disposed between the outer casing body 12 and a guide vane 41, and a cross-sectional shape thereof orthogonal to the main axis O is a wing shape with a middle part swollen in the radial direction. Due to this inlet straightening plate 42, the process gas G sucked from the main suction nozzle 21 is diverted to both sides in the circumferential direction.

Next, a configuration of the discharge nozzle 15 will be described in detail with reference to FIG. 2. As shown in the drawing, the discharge nozzle 15 has a tubular shape extending downward along an axis A extending in a direction orthogonal to the main axis O (i.e., the radial direction from the main axis O). Further, in the following description, a radially inner side toward the main axis O may be referred to as one side in the axis A direction, and a radially outer side therefrom may be referred to as the other side in the axis A direction. The discharge nozzle 15 has a discharge nozzle body 15A and a flange part 15B. An inner circumferential surface 15a of the discharge nozzle body 15A has an inner diameter in a size gradually increasing from one side to the other side in the axis A direction. The flange part 15B is provided at the end of the discharge nozzle body 15A on the other side in the axis A direction. The flange part 15B has a ring shape around the axis A.

The pressure loss body 5 is attached to a surface of the flange part 15B on an inner circumferential side (a flange inner surface 15b). The pressure loss body 5 is provided to adjust pressure loss of a working fluid in the discharge nozzle 15. The pressure loss body 5 according to the present embodiment is formed of a perforated plate and has a circular plate shape around the axis A. The pressure loss body 5 is formed of a perforated plate having a plurality of openings. That is, the pressure loss body 5 blocks a part of a flow path cross-sectional area of the discharge nozzle 15.

Next, an operation of the centrifugal compressor 1 according to the present embodiment will be described. To operate the centrifugal compressor 1, the rotation shaft 2 and the impellers 3 are rotated around the main axis O by a driving source, for example, a motor, or the like. Accordingly, a working fluid outside is taken into the casing 10 through the suction nozzle 16. The working fluid is gradually compressed in the course of flowing through the flow path FC inside the casing 10 from the upstream side to the downstream side and brought into a high pressure state. The working fluid in the high pressure state passes through the discharge scroll B2 and the discharge nozzle 15 and then is taken outside.

Here, the centrifugal compressor 1 described above may unstably behave in a case where it is operated at a lower flow rate than a rated flow rate. Specifically, if a flow rate is low, pressure loss on the discharge nozzle 15 side becomes insufficient, and it is thus not likely to stably gain a lifting height. Therefore, the pressure loss body 5 is provided at the outlet of the discharge nozzle 15 in the centrifugal compressor 1 according to the present embodiment.

Since the pressure loss body 5 is provided, a part of the flow path cross-section of the discharge nozzle 15 can be blocked. In other words, the working fluid passes only through the openings of the pressure loss body 5 formed of the perforated plate. Accordingly, pressure loss of the working fluid in the discharge nozzle 15 can be ensured. In particular, since the working fluid exhibits a uniform flow rate distribution within the flow path cross-section orthogonal to the axis A in the discharge nozzle 15, a magnitude of pressure loss can be adjusted more easily and accurately than in a case where the pressure loss body 5 is provided at another part of the centrifugal compressor 1. As a result, the centrifugal compressor 1 can be operated more stably under the operation condition of a low flow rate.

Furthermore, according to the above-described configuration, since the pressure loss body 5 is provided at the radially outer end of the discharge nozzle 15, the pressure loss body 5 is easily accessible from outside and thus can be attached more easily. In addition, since the flow path cross-section at the radially outer end of the discharge nozzle 15 exhibits a more uniform flow rate distribution than that on the radially inner part, a magnitude of pressure loss can be adjusted more easily and accurately.

A first embodiment of the present invention has been described above. Further, the above-described configuration can be subjected to various changes and modifications within a scope not departing from the gist of the present invention. For example, the pressure loss body 5 may be provided at a position in the middle of the discharge nozzle 15 in the axis A direction, rather than at the end of the discharge nozzle 15. According to this configuration, a position of the pressure loss body 5 can be set with a higher degree of freedom, and thus a magnitude of pressure loss can be adjusted more precisely.

Second Embodiment

Figure 3:
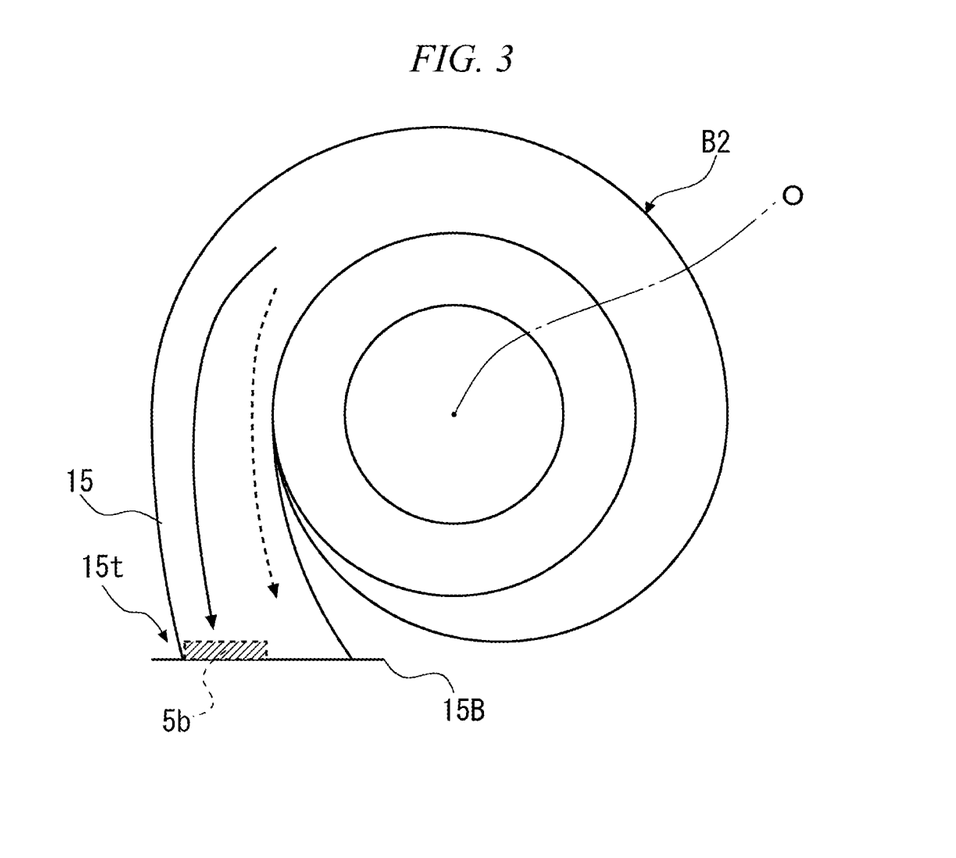
FIG. 3 is a cross-sectional diagram of a discharge scroll and a discharge nozzle according to a second embodiment of the present invention viewed in a main axial direction.
Figure 4:
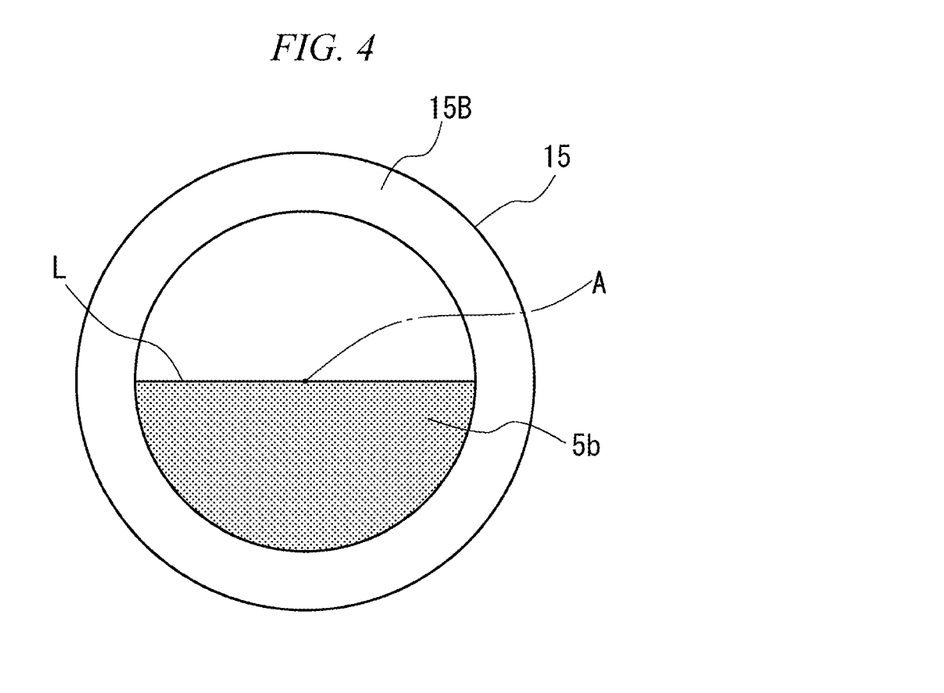
FIG. 4 is a diagram of the discharge nozzle according to the second embodiment of the present invention viewed in an axial direction.

Next, a second embodiment of the present invention will be described with reference to FIGS. 3 and 4. Further, the same reference numerals will be given to similar constituents in each embodiment, and detailed description thereof will be omitted. In the present embodiment, a pressure loss body 5b blocks half of an outlet end 15t of a discharge nozzle 15 as shown in FIG. 3. More specifically, the pressure loss body 5b is provided at a part away from a discharge scroll B2 with respect to a division line L passing through the position of an axis A on a flow path cross-section of the discharge nozzle 15 as shown in FIG. 4. Further, the pressure loss body 5b may be formed of such a perforated plate described in the above-described first embodiment, or may be formed of a smooth plate material with no openings formed thereon.

Here, the working fluid flows from the discharge scroll B2 to the discharge nozzle 15 in a tangent direction of the main axis O. When passing through the discharge scroll B2, a centrifugal force away from the main axis O acts on the working fluid. Accordingly, a flow rate is higher at a portion on a side away from the discharge scroll B2 (indicated by the solid arrow in FIG. 3) on the flow path cross-section of the discharge nozzle 15 than on a side close to the discharge scroll B2 (indicated by the dashed arrow in FIG. 3). According to the above-described configuration, since the pressure loss body 5b is provided at the part exhibiting a relatively high flow rate, pressure loss can be incurred more effectively. As a result, the centrifugal compressor 1 can be operated more stably under the operation condition of a low flow rate.

The second embodiment of the present invention has been described above. Further, the above-described configuration can be subjected to various changes and modifications within a scope not departing from the gist of the present invention.

Third Embodiment

Figure 5:
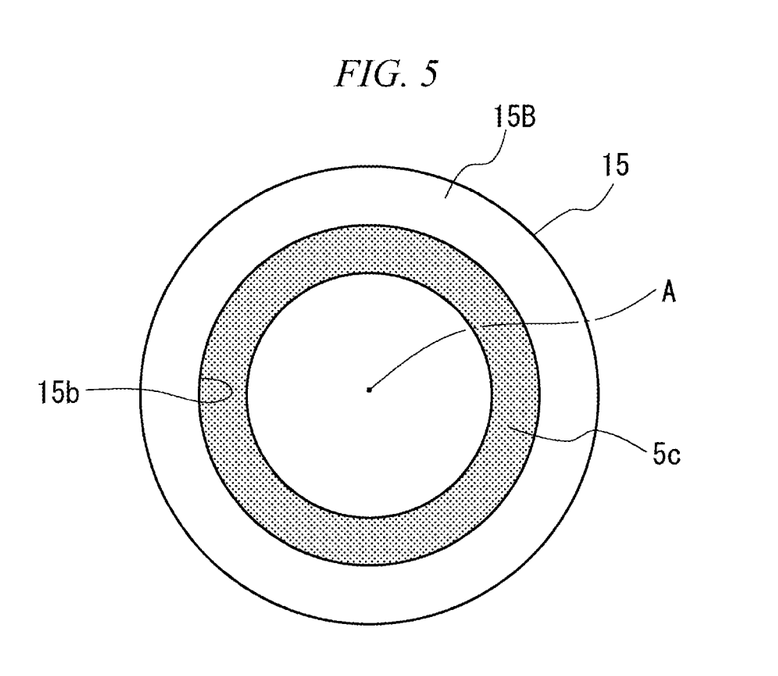
FIG. 5 is a diagram of a discharge nozzle according to a third embodiment of the present invention viewed in an axial direction.

Next, a third embodiment of the present invention will be described with reference to FIG. 5. Further, the same reference numerals will be given to similar constituents in each embodiment, and detailed description thereof will be omitted. In the present embodiment, a pressure loss body 5c stretches in a ring shape along an inner circumferential surface of a discharge nozzle 15 as shown in FIG. 5. That is, the pressure loss body 5c has a ring shape around an axis A and extends along an inner circumferential surface of a flange part 15B (a flange inner surface 15b). Further, the pressure loss body 5c may be formed of such a perforated plate described in the above-described first embodiment or may be formed of a smooth plate material with no openings formed thereon.

According to the above-described configuration, the pressure loss body 5c has a ring shape around the axis A. That is, since the shape of the pressure loss body 5c is simple, a magnitude of pressure loss at the discharge nozzle 15 can be adjusted more easily at low cost.

The third embodiment of the present invention has been described above. Further, the above-described configuration can be subjected to various changes and modifications within a scope not departing from the gist of the present invention.

Fourth Embodiment

Figure 6:
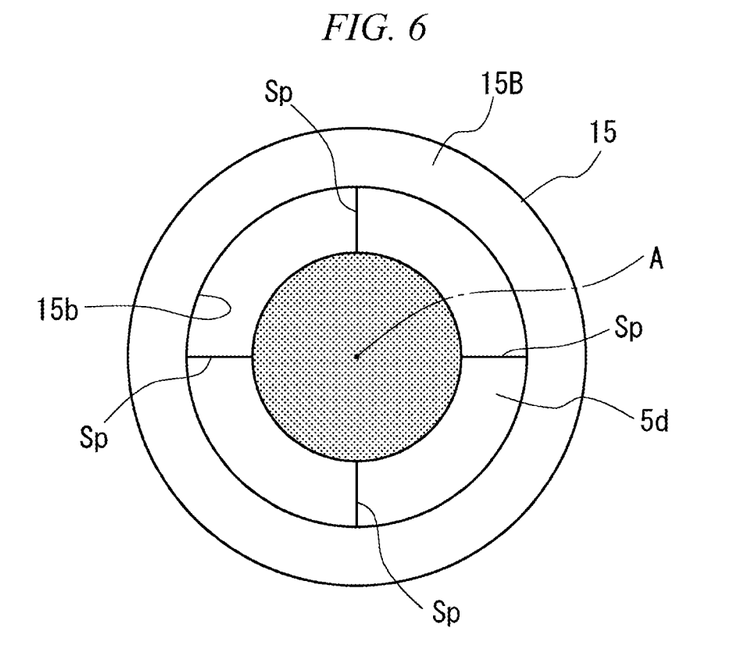
FIG. 6 is a diagram of a discharge nozzle according to a fourth embodiment of the present invention viewed in an axial direction.

Next, a fourth embodiment of the present invention will be described with reference to FIG. 6. Further, the same reference numerals will be given to similar constituents in each embodiment, and detailed description thereof will be omitted. In the present embodiment, a pressure loss body 5d is provided only at a center part including an axis A at an outlet of a discharge nozzle 15 as shown in FIG. 6. That is, the pressure loss body 5d has a circular plate shape in a smaller diameter size than a flange inner surface 15b. The pressure loss body 5d is fixed to the flange inner surface 15b by a plurality of (four) support members Sp arrayed in a circumferential direction at intervals. Further, the pressure loss body 5d may be formed of such a perforated plate described in the above-described first embodiment or may be formed of a smooth plate material with no openings formed thereon.

According to the above-described configuration, the pressure loss body 5d is provided only at the center part of the discharge nozzle 15. That is, since the shape of the pressure loss body 5d is simple, a magnitude of pressure loss at the discharge nozzle 15 can be adjusted more easily at low cost.

The fourth embodiment of the present invention has been described above. Further, the above-described configuration can be subjected to various changes and modifications within a scope not departing from the gist of the present invention.

Fifth Embodiment

Figure 7:
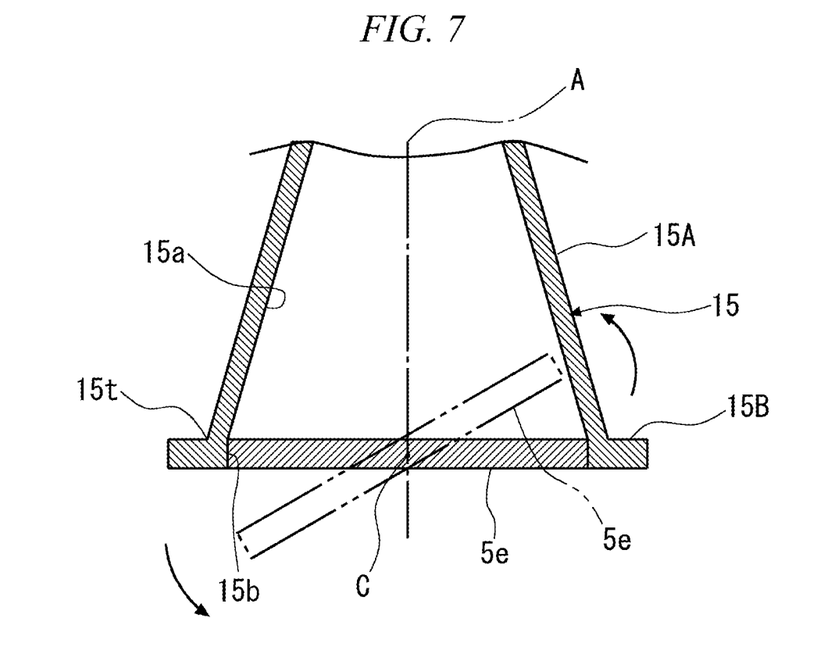
FIG. 7 is a diagram of a discharge nozzle according to a fifth embodiment of the present invention viewed in an axial direction.

Next, a fifth embodiment of the present invention will be described with reference to FIG. 7. Further, the same reference numerals will be given to similar constituents in each embodiment, and detailed description thereof will be omitted. In the present embodiment, a pressure loss body 5e is set to be capable of pivoting around a pivot axis C at an outlet end 15t of a discharge nozzle 15 as shown in FIG. 7. The pressure loss body 5e has a circular plate shape having a diameter size capable of blocking the entire outlet end 15t. The pivot axis C extends in a direction orthogonal to an axis A. The pivot axis C passes through the center of the pressure loss body 5e. Thus, a flow rate of a working fluid discharged from the discharge nozzle 15 can be freely adjusted by changing an amount of pivoting of the pressure loss body 5e.

According to the above-described configuration, by pivoting the pressure loss body 5e around the pivot axis C, a flow path cross-sectional area of the discharge nozzle 15 can be freely adjusted even after construction of the centrifugal compressor 1 is completed. As a result, a magnitude of pressure loss of the discharge nozzle 15 can be adjusted more easily and accurately.

The fifth embodiment of the present invention has been described above. Further, the above-described configuration can be subjected to various changes and modifications within a scope not departing from the gist of the present invention.

EXPLANATION OF REFERENCES

1 Centrifugal compressor
2 Rotation shaft
3, 3a, 3b Impeller
5, 5b, 5c, 5d, 5e Pressure loss body
10 Casing
11 Casing body
11a Diaphragm
11b Head
12 Outer casing body
13a Thrust bearing
13B Radial bearing
15 Discharge nozzle
15A Discharge nozzle body
15a Inner circumferential surface
15B Flange part
15b Flange inner surface
15t Outlet end
16 Suction nozzle
21 Main suction nozzle
25 Main opening
41 Guide vane
42 Inlet straightening plate
A Axis
B1 Suction scroll
B2 Discharge scroll
C Pivot axis
L Division line
O Main axis
Sp Support member

What is claimed is:
1. A compressor comprising:
a rotation shaft that is capable of rotating around a main axis;
an impeller provided integrally with the rotation shaft;
a casing that covers the impeller from an outer circumferential side and forms a flow path through which a working fluid circulates;
a discharge scroll that is provided at an end of the flow path on a downstream side and extends in a spiral shape around the main axis;
a discharge nozzle that communicates with the discharge scroll on the downstream side and extends from the discharge scroll in a tangent direction around the main axis; and
a pressure loss body that has a plate shape extending in a direction orthogonal to an axis of the discharge nozzle extending in a radial direction orthogonal to the main axis and is capable of blocking a part of a flow path cross-section of the discharge nozzle.

2. The compressor according to claim 1,
wherein the pressure loss body is provided at a radially outer end of the discharge nozzle from the main axis.

3. The compressor according to claim 1,
wherein the pressure loss body is provided at a position in a middle of the discharge nozzle in an axial direction.

4. The compressor according to claim 1,
wherein the pressure loss body is provided at a part away from a discharge scroll with respect to a division line passing through a position of the axis on the flow path cross-section of the discharge nozzle.

5. The compressor according to claim 1,
wherein the pressure loss body extends along an inner circumferential surface of the discharge nozzle and has a ring shape around the axis.

6. The compressor according to claim 1,
wherein the pressure loss body is provided only at a center part including the axis of the discharge nozzle.

7. The compressor according to claim 1,
wherein the pressure loss body has a plate shape covering the flow path cross-section and is capable of pivoting around a pivot axis extending in a direction orthogonal to the axis.

8. The compressor according to claim 1,
wherein the pressure loss body is formed of a perforated plate.

* * * * *